July 21, 1931.  A. RONNING ET AL  1,815,272

TRACTOR HARVESTER

Original Filed March 29, 1924

Inventors.
Aldoph Ronning
Earnest A. Hedenstrom
Andrean G. Ronning, deceased,
By Aldoph Ronning and Jacob A. Ronning,
Executors.

BY

ATTORNEY

Patented July 21, 1931

1,815,272

UNITED STATES PATENT OFFICE

ADOLPH RONNING AND ERNEST A. HEDENSTROM, OF MINNEAPOLIS, MINNESOTA, AND ANDREAN G. RONNING, DECEASED, LATE OF MINNEAPOLIS, MINNESOTA, BY ADOLPH RONNING, OF MINNEAPOLIS, AND JACOB A. RONNING, OF ST. PAUL, MINNESOTA, EXECUTORS

TRACTOR HARVESTER

Original application filed March 29, 1924, Serial No. 702,774, now Patent No. 1,660,767, dated February 28, 1928. Divided and this application filed February 27, 1928. Serial No. 257,536.

Figure 1:
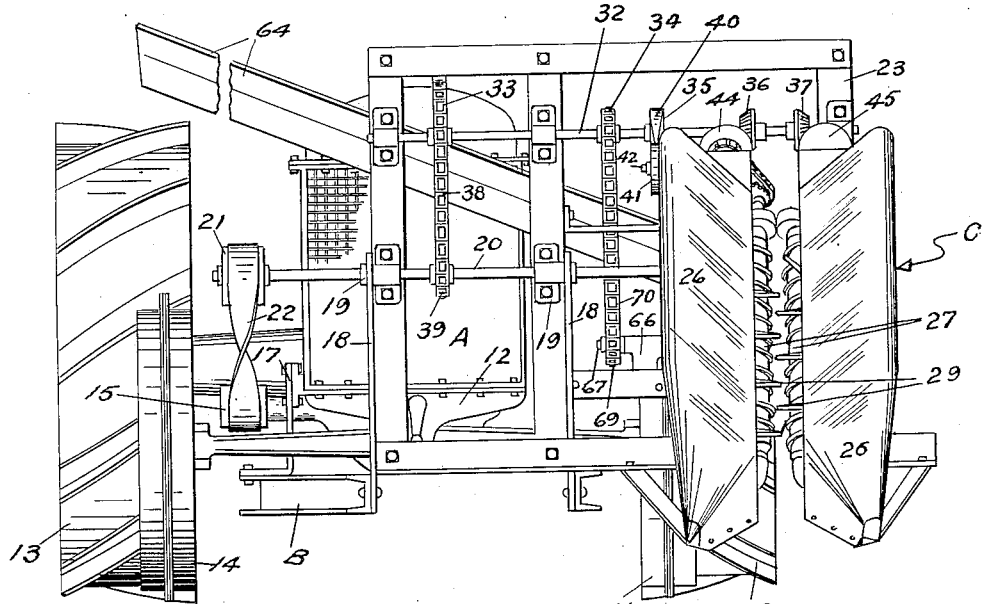
Figure 2:
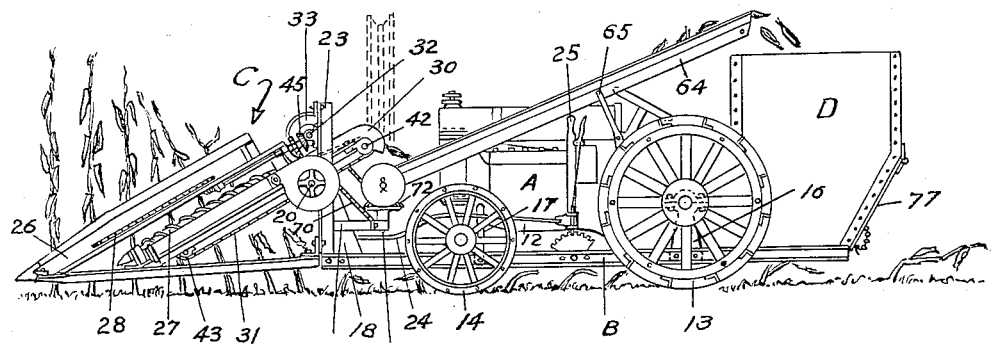

This invention relates to combination tractor implements and the primary object is to provide a tractor attachment in the form of a frame which is carried by and longitudinally of the tractor, the front end of which frame operatively and adjustably supports a harvesting implement while the rear end of the frame supports a counterbalancing receptacle which is adapted to receive harvested crop from the implement by means of a conveyor. A further and more detailed object is to provide an efficient, practical and highly novel corn harvester adapted to be carried by and adjustably secured to a power unit such as a tractor, and which will remove the ears of corn from the stalks, in advance of the tractor, as the latter progresses, and deliver them, selectively, either to a hopper at the rear of the tractor, or laterally to a wagon or other vehicle drawn along at the side of the tractor. Further and more specific objects will be disclosed in the course of the following specification, reference being had to the accompanying drawings, wherein:

Fig. 1 is a front elevation of the machine, and Fig. 2 is a side elevation of the machine, as seen from the left and on a reduced scale.

This application is a division of a copending application, Ser. No. 702,774, filed March 29, 1924, for "harvesting machine", resulting in Patent No. 1,660,767, issued February 28th, 1928.

Referring to the drawings more particularly and by reference characters, A designates a tractor of common and well known construction having a main frame 12, traction wheels 13, steering wheels 14, and a power transmission pulley 15.

Suitably secured to the tractor, as by braces 16 and 17, is an underslung auxiliary frame B, which extends beyond the ends of the tractor, to support the harvester C at the front end, and a hopper D at the rear end. This frame is preferably arranged below the axles of the tractor wheels, for sake of convenience when attaching it to the tractor, but may extend over the front axle. The front end of the frame B has a pair of upright standards 18 in the upper ends of which are trunnioned a pair of bearing members 19 in which is journaled a main harvester drive shaft 20. This shaft has a pulley 21 which is driven by a belt 22 from the power pulley 15 of the tractor. The combined trunnion and bearing members 19 are secured to and thus tiltably support a harvester frame 23 so that it will swing on the axis concentric with the shaft 20, and its tiltable position is controlled through a connecting rod 24 and a hand lever 25 on the tractor and within convenient reach of the tractor operator.

The harvester consists of a pair of longitudinally spaced gathering frames 26, which are provided with spirally flanged snapping rollers 27, and gathering chains 28 having prongs 29, which, as the harvester is advanced over the row of corn, pull or guide the corn stalks in between the frames and rollers, as shown in the drawings. The rollers first engage the stalks at their lower ends, and, as they advance they also travel up the stalks until the entire length of each stalk has been drawn through between the rollers. The rollers are so designed with respect to each other that they will permit the stalks to pass therebetween but are close enough together so that they will not permit the ears of corn to pass through. Consequently the ears will be pulled off from the stalks, and, as the left roller 27 is slightly higher than the right roller the snapped ears will fall to the right or over the right roller and into a housing 30 (see Fig. 2), and from which they will be carried by an endless conveyor 31.

The driving mechanism for the elements immediately above described may be set forth as follows: A shaft 32 is journaled in the frame 23, above the shaft 20, and is provided with a sprocket gear 33, sprocket pinion 34, pulley 35, and a pair of bevel pinions 36, 37. The shaft 32 is driven by a chain 38, which passes over the gear 33 and over a sprocket pinion 39 on the shaft 20. The pulley 35 is connected by a belt 40 to a pulley 41 on a shaft 42 which drives the carrier chain 31, the lower end of said chain passing over a pinion 43. The bevel pinions 36 and 37 mesh, respectively, with bevel pinions 44 and 45, which drive the gathering chains and snapping rollers in the manner more fully described in the above noted parent application, resulting in Patent No. 1,660,767.

As the snapped corn is elevated to the upper end of the carrier 30—31, it drops upon the lower end of an inclined conveyor 64, which may be arranged either transversely, as in Fig. 1, when the corn is to be delivered into a wagon box at the side of the machine, or it may be extended rearwardly, as in Fig. 2, and supported on a crutch or support 65, so that it will deliver the corn into the hopper D. The driving, tilting and swinging mechanism for the conveyor 64 is also fully illustrated and described in the parent application, but may be briefly indicated, as follows: A supporting bracket or frame 66 extends rearwardly from the frame 23 and in it are journaled two short shafts 67 and 68. The shaft 67 has a sprocket pinion 69 which is connected by a chain 70 to the pinion 34 on the shaft 32. This shaft 67 also has a bevel pinion (not shown) which meshes with a bevel gear member 72, rotatable on the shaft 68. The conveyor boom 64 is mounted for swinging movement about a vertical pivot concentric with the shaft 68, and the bevel gear 72 always supplies driving power to an endless conveyor of the boom regardless of what position it may be in.

The hopper D which is arranged to receive the corn when the conveyor is in the rearward position, is provided at its lower end with a door 77 adapted to be opened when the container is to be emptied.

It is understood that suitable modifications may be made in the general design and structural details of the invention as herein disclosed, provided, however, that such modifications come within the spirit and scope of the appended claims. Having now therefore fully shown and described our invention, what we claim is:

1. The combination with a power unit having ground members adapted to support, propel and steer the same, of an auxiliary frame arranged longitudinally of the power unit and secured thereto, an agricultural implement mounted at the front end of the frame and in advance of the ground members, a container mounted upon the rear end of the frame and rearwardly of the ground members, and a conveying device for conveying material from the agricultural implement to the container.

2. The combination with a power unit having traction and steering wheels, of an auxiliary frame arranged longitudinally of the power unit and secured thereto, an agricultural implement mounted at the front end of the frame, a container mounted upon the rear end of the frame, and a conveying device for conveying material from the agricultural implement to the container, said conveying device being pivotally mounted at its front end so that it may be swung to a transverse position to deliver such material laterally of the power unit when so desired.

3. The combination with a tractor unit, of an agricultural implement mounted at the front thereof, a container mounted at the rear of the traction unit, a conveyor adapted at one end to receive material from the agricultural implement, said conveyor being pivotally mounted at said end so that its opposite end may be arranged to selectively deliver such material rearwardly to said container or transversely to the side of the machine.

4. The combination with a self propelled member having traction wheels and steering wheels supporting the same, a detachable frame secured longitudinally of and substantially under the self propelled member, a material gathering mechanism tiltably secured to and carried by the frame in advance of the wheels of the self propelled member, a container carried by the frame rearwardly of the member to partly counterbalance the gathering mechanism at the front of the member, and means for conveying material from the mechanism to the container.

5. The combination with a normal tractor, of an auxiliary frame secured longitudinally to the tractor and extending beyond both ends thereof, an implement carried by the front end of the frame, a receptacle carried by the rear end of the frame and means for conveying material from the implement to the receptable, said conveying means being adjustably mounted so as to be shiftable to a transverse position whereby material may be conveyed to a point laterally with respect to the machine.

6. In a machine of the character described the combination comprising a tractor having laterally disposed supporting and traction devices, an underslung frame adapted to extend longitudinally of the tractor and between said devices so as to be liftable up into attaching position to the tractor, means for so attaching the frame to the tractor, and a harvester tiltably secured to and carried at the front end of the frame and entirely supported thereby.

7. In a machine of the character described the combination comprising a tractor having laterally disposed supporting and traction devices, an underslung frame adapted to extend longitudinally of the tractor and between said devices so as to be liftable up into attaching position to the tractor, means for so attaching the frame to the tractor, a harvester tiltably mounted upon the front end of the frame, and means extending to within reach of the tractor operator for tiltably adjusting the harvester with respect to the frame.

8. In a harvester attachment for a tractor having laterally disposed supporting and traction devices, a frame carried under the tractor and between the said devices, means attaching the frame to forward and rearward parts of the tractor, a second frame tiltably carried by the forward end of the first mentioned frame, a harvesting mechanism carried by the second frame, and a receiving receptacle carried at the rear of the first mentioned frame to receive harvested crop from and partly counterbalance the harvesting mechanism.

9. In a harvester attachment for a tractor having front steering means and rear traction devices, a frame extending longitudinally under the tractor and secured thereto between the traction devices and at the front end of the tractor, rigid standards at one end of the frame, a harvester tiltably carried by said standards, and means for tiltably adjusting the harvester.

10. In a harvester attachment for a tractor having front steering means and rear traction devices, a frame extending longitudinally under the tractor and secured thereto, a harvester frame tiltably secured to one end of the first mentioned frame and a receptacle at the other end thereof, a conveyor carried at one end by the harvester frame for delivering crop to the receptacle, a shaft journaled in the harvester frame for transmitting power from the tractor engine to the harvester, and a power connection between the shaft and said conveyor.

11. A corn picking attachment for a tractor comprising a longitudinally disposed picker mechanism arranged in an offset position with respect to the median line of the tractor, a frame secured to the tractor and supporting said picker mechanism, said frame extending to the rear of the tractor, a receiving hopper carried by the rear end of the frame so as to partly assist in counterbalancing the weight of the picker mechanism, and means for conveying picked corn from the picker mechanism to the hopper.

12. A corn picking attachment for a tractor comprising a longitudinally disposed picker mechanism arranged in an offset position with respect to the median line of the tractor, a frame secured to the tractor and supporting said picker mechanism, said frame extending to the rear of the tractor, a receiving hopper carried by the rear end of the frame so as to partly assist in counterbalancing the weight of the picker mechanism, and means including an inclined, power driven conveyor for conveying picked corn from the picker mechanism to the hopper.

13. The combination with a tractor having rear drive members and a front axle with steering wheels attached thereto, of a frame extending longitudinally of the tractor and secured to the rear thereof, means for securing an intermediate portion of the frame to the body of the tractor at a point adjacent to but separate from the front axle so that said axle may function without interference with the frame, and an implement adjustably carried upon the front end of the frame in advance of the front axle.

14. The combination with a tractor having rear drive members and a front axle with steering wheels attached thereto, of a frame extending longitudinally of the tractor and secured to the rear thereof, means for securing an intermediate portion of the frame to the body of the tractor at a point adjacent to but separate from the front axle so that said axle may function without interference with the frame, an implement tiltably supported upon the frame, and means extending to within reach of the tractor operator for tiltably adjusting the implement with respect to the frame.

In testimony whereof, we affix our signatures.

ADOLPH RONNING,
ERNEST A. HEDENSTROM,
                *Joint Inventors.*
ADOLPH RONNING,
JACOB A. RONNING,
*Executors of the Last Will and Testament of Andrean G. Ronning, Deceased.*